(No Model.)

E. A. BOSTROM.
LEVELING INSTRUMENT.

No. 280,713. Patented July 3, 1883.

WITNESSES:
Francis McArdle.
C. Sedgwick.

INVENTOR:
E. A. Bostrom
BY Munn & Co
ATTORNEYS.

United States Patent Office.

ERNST A. BOSTROM, OF NEWNAN, GEORGIA.

LEVELING-INSTRUMENT.

SPECIFICATION forming part of Letters Patent No. 280,713, dated July 3, 1883.

Application filed March 13, 1883. (No model.)

*To all whom it may concern:*

Be it known that I, ERNST A. BOSTROM, of Newnan, county of Coweta, and State of Georgia, have invented a new and Improved Leveling-Instrument, of which the following is a full, clear, and exact description.

The object of my invention is to furnish an inexpensive instrument adapted for use by farmers and others in the work of leveling ditches and terraces, and for other work in which a true or an approximation to a true level is required.

The invention consists in a gravity plumb-rod and a level combined together and floated by a bearing-point on a staff, as hereinafter described and claimed.

Reference is to be had to the accompanying drawings, forming a part of this specification, in which similar letters of reference indicate corresponding parts in both figures.

Figure 1:
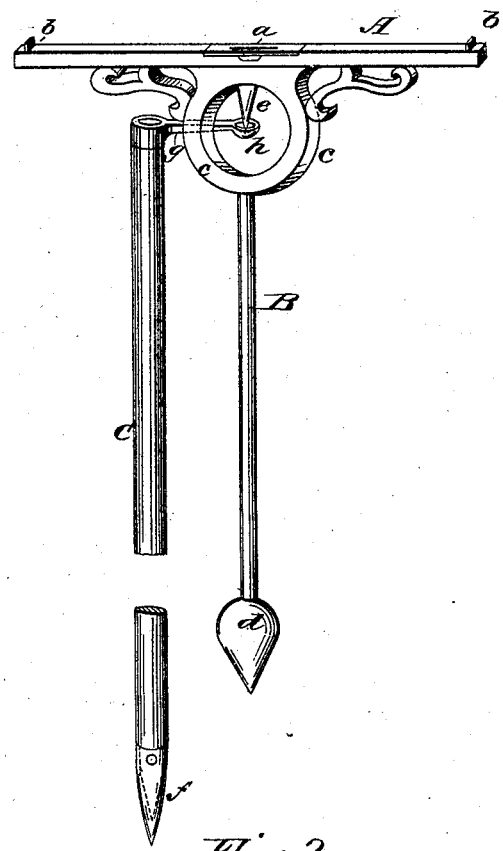
Figure 2:
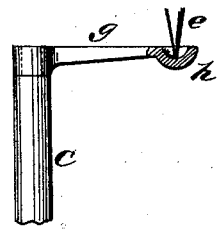

Figure 1 is a perspective side view of my improved instrument, and Fig. 2 is a detail section.

A is a bar provided with a bulb or vial at $a$, and with sights $b\ b$, of any suitable character, at its ends.

B is a gravity or plumb rod, connected at one end to level A by arms $c\ c$, and provided with a weight, $d$, at the outer end. The rod is held by arms $c$ at mid-length of the bar or level A, and between the arms is a point, $e$, for support of the level and rod.

C is a staff provided with a metal point, $f$, so that it may be readily entered in the ground, and fitted at its upper end with an arm, $g$, that is formed with a cup or concave, $h$, for receiving the point $e$ of the instrument.

In using the instrument the staff is set in the ground, and the instrument being then hung on the arm $g$ by the point $e$, the gravity-rod takes a vertical position and retains the level A at a true horizontal. The instrument is also free to swing to the right or left within a range of one hundred and eighty degrees, which may be increased, if desired, by properly shaping the arms $c$. The bulb or vial $a$ serves to show when the instrument is properly adjusted. When hung in this manner, the instrument is used by sighting over the sights $b$, and an approximately true level readily determined. With care a true level can be had.

This instrument is inexpensive, and for use of farmers in ordinary work answers all the purposes of expensive instruments.

Having thus described my invention, I claim as new and desire to secure by Letters Patent—

The bar A, having on its upper side the end sights, $b\ b$, and intermediate bulb, $a$, the subjacent arms $c\ c$, the point $e$, and the end-weighted rod B $d$, in combination with the pointed staff C, having the arm $g$, with end cup, $h$, the point $e$ and the rod B being in alignment, as shown and described.

ERNST A. BOSTROM.

Witnesses:
 I. T. REESE,
 A. C. PEASE.